Patented June 22, 1926.

1,590,079

UNITED STATES PATENT OFFICE.

LAWRENCE C. BYCK, OF TOTTENVILLE, NEW YORK, ASSIGNOR TO BAKELITE CORPORATION, OF NEW YORK, N. Y., A CORPORATION OF DELAWARE.

POTENTIALLY REACTIVE LIQUID-COATING COMPOSITION.

No Drawing.      Application filed November 5, 1923. Serial No. 673,017.

This invention relates to liquid coating-compositions such as varnishes, impregnating solutions, lacquers and the like, containing a phenolic resin and a modifying or plasticizing agent. The present application is a continuation in part of my prior and co-pending application Serial No. 590,943, filed September 27, 1922.

In said application, I have pointed out that by mixing and properly reacting a suitable phenolic body, such as phenol or cresol, with certain fatty oils, and specifically with tung oil, in presence of small proportions of so-called "converting agents" of which aluminum chlorid and phosphoric acid may be regarded as types, I obtain a viscous fluid product which does not possess the characteristic odor of tung oil, and which I now regard as a combination of the oil, or some conversion product thereof, with the phenol; the term "combination" being here used in its broad sense to indicate some physical, chemical or physico-chemical association or union, the nature of which is at present unknown. According to the preferred embodiment of the invention, as described in the said prior application, I react upon this viscous product, either in presence or absence of water, with a hardening agent having a mobile methylene group, as for instance formaldehyde, trioxymethylene, hexamethylenetetramine, etc., the hardening agent proportioned to the phenol to yield a resin of the so-called permanently soluble and fusible or non-reactive type. The resulting non-reactive composition may be rendered potentially reactive by the addition of suitable further proportions of the same or other methylene-containing hardening agents. The expression "potentially reactive" is well understood in this art as indicating that the product (resin, molding mixture, varnish film, impregnation residue, etc.) may by sufficient application of heat be transformed to a hard and infusible or so-called resinoid state. While I prefer to proceed as described above in two stages, producing first a non-reactive condensation product, that is to say, a resin which does not undergo the above-described transformation by simple application of moderate heat, and thereafter rendering the same potentially reactive by suitable methylene additions, it is within the scope of my invention to add sufficient methylene-containing hardening agent in the first instance to impart to the composition the desired potentially reactive character. This latter procedure is however decidedly more difficult to control.

In order that the present invention may be fully understood I will now give an illustrative example of the application of the same to the preparation of a varnish or impregnating solution, it being understood that the conditions and proportions stated are illustrative only, and will be varied according to the particular technical effect desired.

I first prepare a mixture of a suitable phenolic body such as phenol or cresol, a vegetable oil, such as tung oil, and the converting agent. The proportions used as well as the materials selected will depend upon the particular results sought. Smaller proportions of the oil, such as 20–30 parts of tung oil to 100 parts of phenol, yield a hard and substantially non-plastic final product, although the plasticizing effect of the oil addition is strongly marked in the product before the final hardening. When decidedly larger proportions of oil are used the ultimate product or varnish film is correspondingly plasticized; and in the case where tung oil is introduced into the original mixture in larger amount, preferably upward of about 75% of the phenol by weight, the subsequent operations being properly performed, the final film, although infusible and resistant to most chemical agents, is highly flexible. For the preparation of such flexible films I proceed as follows:

A typical mixture may comprise phenol, 100 parts; tung oil, 140–150 parts; phosphoric acid, 1–2 parts. The mixture is heated to boiling under a reflux condenser for one half to six hours. The viscosity of the product will be greater as the heating is longer, and the consistency as well as certain other properties of the varnish may be varied at will by a careful control of this heating stage. The same results may be obtained by more prolonged heating at lower temperatures; but such prolonged action or such high proportion of converting agent as will result in the solidification of the mixture must be avoided. The product is liquid at ordinary and higher temperatures, more or less viscous according to the reacting conditions, dark brown in color, transparent in thin layers, and possesses a characteristic odor which does not resemble that of tung oil. Some free phenol can be identified in the product but there is no indication that tung oil, either polymerized or unpolymerized, is present therein to any substantial extent. For convenience I will refer to this product as the phenol-oil composition. When prepared as described above it contains a relatively small proportion of the original phenol in free or uncombined condition, removable by vacuum distillation or by extraction by means of cold caustic alkali. I have not been able to identify or to isolate uncombined tung oil.

To this phenol-oil composition I add 5-14 parts by weight of dry hexamethylenetetramine, and heat rapidly with stirring until the evolution of ammonia ceases. The use of substantially larger proportions of hexamethylenetetramine should be avoided at this stage as tending to give a resin of the infusible type. With the limited proportions mentioned the product is a non-reactive resin in the sense that it cannot be hardened by simple application of heat, although it may gelatinize at high temperatures. It is permanently fusible, in the sense that it can be maintained indefinitely in fusion at temperatures only slightly above its melting point. For convenience I will refer to this product as the non-reactive phenol-oil-methylene resin. Its characteristics of course vary according to the conditions of its preparation. Made as above it is after cooling a dark brown, transparent resinous body, the hardness of which depends largely upon the length of the heating in the preparation of the phenol-oil composition. It is usually brittle when thoroughly cold, and rather rubbery at higher temperatures. It may flow slowly at room or summer temperatures. It is freely soluble in turpentine and mixtures of turpentine and benzol; partially soluble in benzol, alcohol and acetone; soluble in mixtures of benzol with alcohol or acetone. It may be used in this non-reactive state as a varnish base for applications where infusibility and insolubility in the final film are not important; but I prefer to impart to it a potentially reactive character. My preferred method of accomplishing this is as follows:

The non-reactive phenol-oil-methylene resin is dissolved while hot in any desired solvent, for example turpentine, using for example 125-175 parts of turpentine to each 100 parts by weight of phenol in the original mixture. The solution is cooled to about 100°-110° C. and 6-14 parts of dry hexamethylenetetramine (for each 100 parts of phenol in the original mixture) added with stirring. In a typical case the quantity of additional hexamethylenetetramine added at this stage is such that the total methylenes present will correspond approximately to 20 parts of hexamethylenetetramine to each 100 parts by weight of phenol originally used. The solution is then heated slowly to about 125°-135° to effect a partial reaction only of the hexamethylenetetramine. The effect of this is to stabilize the solution and to avoid the separation of small quantities of a crystalline substance, which otherwise may occur at times. The resulting varnish may be thinned as desired with benzol or other appropriate solvent and is ready for use. When it is desired to prepare a lacquer the usual lacquer solvents, amyl acetate, amyl alcohol, etc. are added.

Varnishes and lacquers prepared as above may be applied to wood, metal, fabrics, paper and all other bases, and yield when baked (preferably at about 160°-170° C.) lustrous, adherent, mechanically and chemically resistant, electrically insulating and highly flexible films. They have been found well suited, among other uses, for the manufacture of so-called composite cardboard, or laminated products (U. S. Patent #1,019,406 to L. H. Baekeland) comprising sheets of paper, canvas, etc. coated or impregnated with the phenolic condensation product, and consolidated and transformed by sufficient application of heat.

Varnishes similar in type but differing among themselves in their specific characteristics have been prepared by this process from a wide variety of fatty oils, including drying oils such as tung and linseed, semi-drying oils as soya bean and fish-oils, and miscellaneous or non-drying oils, as perilla, castor and rape-seed. As will be readily understood the details of the process, including the proportions of the reagents, the time and temperature of heating, etc. will be varied in accordance with the particular technical effects to be obtained as well as with the particular oils chosen. All of these oils are capable, under properly controlled conditions, of yielding excellent varnish films; but so far as my investigations have gone, the films from the compositions prepared with tung oil exhibit by far the highest degree of flexibility.

The invention is not restricted to the employment of any particular converting agent, but whatever converting agent is used it is preferably employed in such small proportions (not exceeding 3% by weight of the phenol, and usually much less than this) that it will be unnecessary to eliminate it by washing. Washing the phenol-oil composition removes uncombined phenol, disturbes the reacting proportions, and tends to irregularities and uncertainties in the final product. Among the converting agents which I have successfully used I may mention anhydrous aluminum chlorid, sulfur chlorid, sulfur antimony sulfids, anhydrous hydrochloric acid, phosphoric acid and anhydride, concentrated sulfuric acid, oxalic acid, pyrogallol and acetic anhydrid. Many other substances, both inorganic and organic, are capable of the same or similar action.

I claim:

1. A potentially reactive liquid coating-composition comprising a non-reactive phenol-oil-methylene resin, a methylene-containing hardening agent therefor, and a solvent for said components.

2. A potentially reactive liquid coating-composition comprising a non-reactive phenol-tung oil-methylene resin, a methylene containing hardening agent therefor, and a solvent for said components.

3. Process of making a liquid coating-composition comprising commingling a phenol, a fatty oil, and a converting agent, the converting agent not in excess of 3% by weight of the phenol; reacting said materials until a viscous product results; and adding thereto a solvent, and a methylene-containing hardening agent in proportion to impart to the composition a potentially reactive character.

4. Process of making a liquid coating-composition comprising commingling a phenol, tung oil, and a converting agent, the converting agent not in excess of 3% by weight of the phenol; reacting said materials until a viscous product results; and adding thereto a solvent, and a methylene-containing hardening agent in proportion to impart to the composition a potentially reactive character.

5. Process of making a liquid coating-composition comprising commingling a phenol, a fatty oil, and a converting agent, the converting agent not in excess of 3% by weight of the phenol; reacting said materials until a viscous product results; and adding thereto a solvent, and a methylene-containing hardening agent in proportion to impart to the composition a potentially reactive character and stabilizing the composition by application of heat.

6. Process of making a liquid coating-composition comprising commingling a phenol, tung oil, and a converting agent, the converting agent not in excess of 3% by weight of the phenol; reacting said materials until a viscous product results; and adding thereto a solvent, and a methylene-containing hardening agent in proportion to impart to the composition a potentially reactive character and stabilizing the composition by application of heat.

7. Process of making a potentially reactive liquid coating-composition comprising commingling a phenol, a fatty oil, and a converting agent, reacting said products until a viscous phenol-oil-composition results; adding a methylene-containing hardening agent in proportion to yield a non-reactive phenol resin and reacting the same; and thereafter incorporating a solvent and such further amount of methylene-containing hardening agent as will impart to the product a potentially reactive character.

8. Process of making a potentially reactive liquid coating-composition comprising commingling a phenol, tung oil, and a converting agent; reacting said products until a viscous phenol-oil composition results; adding a methylene-containing hardening agent in proportion to yield a non-reactive phenol resin and reacting the same; and thereafter incorporating a solvent and such further amount of methylene-containing hardening agent as will impart to the product a potentially reactive character.

In testimony whereof, I affix my signature.

LAWRENCE C. BYCK.